(No Model.)

A. H. SMITHSON.
ASH PAN CLEANER.

No. 414,455. Patented Nov. 5, 1889.

WITNESSES:

INVENTOR:
A. H. Smithson
BY Munn &Co.
ATTORNEYS.

UNITED STATES PATENT OFFICE.

ALTON H. SMITHSON, OF ATLANTA, GEORGIA.

ASH-PAN CLEANER.

SPECIFICATION forming part of Letters Patent No. 414,455, dated November 5, 1889.

Application filed May 18, 1889. Serial No. 311,238. (No model.)

*To all whom it may concern:*

Be it known that I, ALTON H. SMITHSON, of Atlanta, in the county of Fulton and State of Georgia, have invented a new and Improved Ash-Pan Cleaner, of which the following is a full, clear, and exact description.

With the ordinary form of locomotive ash-pan it frequently occurs that the grates are burned out, owing to the fact that the ash-pan can be cleaned only at times when the engine is at rest. It is to overcome this difficulty and at the same time to provide for regulating the draft that I have designed the ash-pan cleaner, forming the subject-matter of this application.

The invention consists, essentially, of a plate or disk mounted within the ash-pan and provided with a rearwardly-extending rack, a gear which engages the rack, and a gear-operating mechanism, whereby the gear, and with it the plate, may be reciprocated, all as will be hereinafter more fully explained, and specifically pointed out in the claims.

Reference is to be had to the accompanying drawings, forming a part of this specification, in which similar figures of reference indicate corresponding parts in both views.

Figure 1:
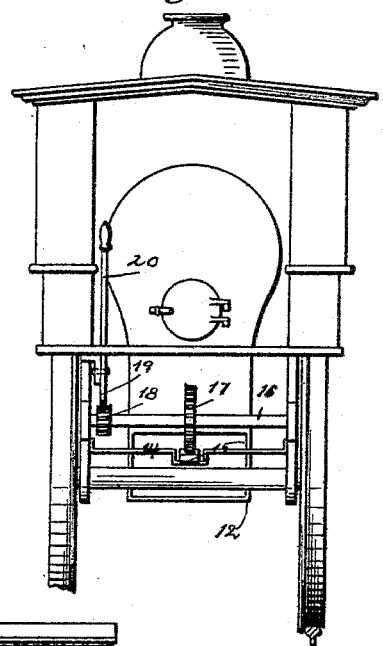
Figure 2:
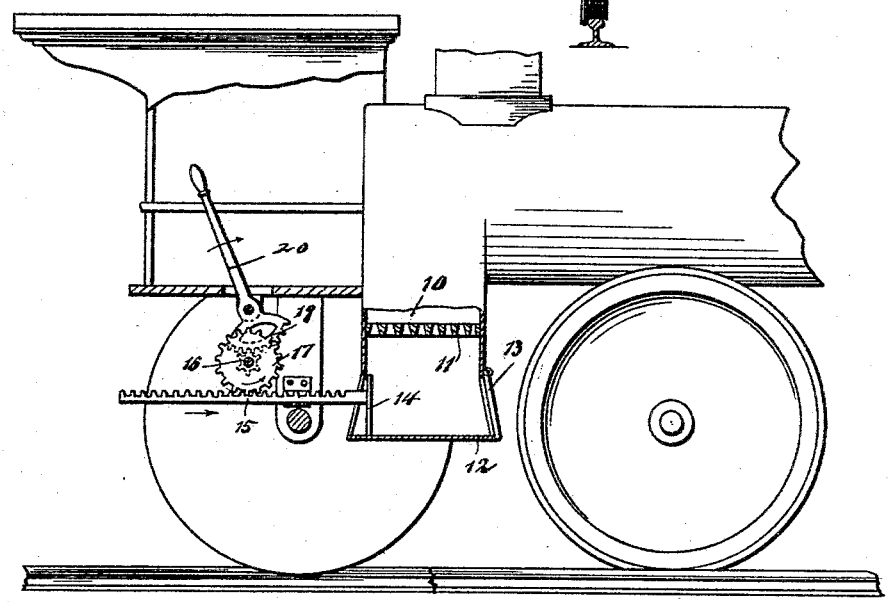

Figure 1 is a rear view of a portion of a locomotive, representing the same as it appears when provided with my improved ash-pan cleaner; and Fig. 2 is a side view in partial section.

In the drawings, 10 represents the fire-box, 11 the grate, and 12 the ash-pan, located, as usual, beneath the grate, the forward end of this ash-pan being normally closed by a hinged trap 13. Within the ash-pan 12 I mount a plunger or pusher consisting of the plate 14, that is rigidly connected to a rearwardly-extending rack 15, and above the rack I mount a shaft 16, which carries a gear 17 and a pinion 18, the gear 17 engaging the rack, while the pinion is engaged by a segmental rack 19, said rack being rigidly connected to a lever 20, that is fulcrumed to any convenient support. The rear end of the ash-pan 12 is open; but this open end may be closed by moving the plate 14 to the position in which it is shown in Fig. 2.

In operation, if the lever 20 be thrown in the direction of the arrow shown in connection therewith in Fig. 2, the gear 17 would be moved in the direction of its arrow, and the rack 15 will be carried forward, thus forcing the plate 14 toward the forward end of the ash-pan, and as the plate bears closely against the side walls and bottom of the pan all ashes deposited within the pan will be forced forward and outward, the trap or door 13 rising when subjected to the pressure of the advancing ashes.

Not only does the plate 14 serve as a pusher for removing the ashes, but it also acts as a damper, closing off the draft when in the position shown in Fig. 2, but permitting the entrance of air when slightly advanced, as will be readily understood.

By means of such a construction as the one above described I am able to clean the ash-pan at any moment, and hence all danger of burning the grates is avoided.

Having thus described my invention, I claim as new and desire to secure by Letters Patent—

1. The combination, with an ash-pan having an imperforate bottom and provided with a hinged trap closing one end thereof, of a plunger within the said pan, substantially as described.

2. The combination, with an ash-pan having one end open, of a plunger mounted in the pan and serving as a damper to open or close the said open end of the pan, substantially as herein shown and described.

3. The combination, with an ash-pan having an imperforate bottom and having open ends, and a hinged trap for closing one end of the pan, of a plunger mounted in the pan, and means for operating the plunger, whereby the plunger is made to serve as a means for removing the ashes from the pan and as a damper for one end of the said pan, substantially as described.

4. The combination, with a plate, of a rack rigidly connected thereto, a gear which engages the rack, a pinion carried by the gear-shaft, a segmental rack engaging the pinion, and a lever connected to said rack, all the parts being arranged as and for the purpose stated.

5. The combination, with an ash-pan formed with an open rear end and a flap which normally closes the forward end, of a plate mounted within the ash-pan, a rack rigidly connected to the plate and extending to the rear therefrom, a gear which engages the rack, a pinion arranged in connection with the gear, a segmental rack which engages the pinion, and a lever rigidly connected to the segmental rack, substantially as described.

ALTON H. SMITHSON.

Witnesses:
HENRY R. POWERS,
J. C. REYNOLDS.